(12) United States Patent
Ackley et al.

(10) Patent No.: US 8,216,343 B2
(45) Date of Patent: *Jul. 10, 2012

(54) RADIAL FLOW REACTOR WITH MOVABLE SUPPORTS

(75) Inventors: Mark William Ackley, East Aurora, NY (US); Cem E. Celik, Grand Island, NY (US); Jeffert John Nowobilski, Orchard Park, NY (US); James Stanley Schneider, Akron, NY (US)

(73) Assignee: Praxair Technology, Inc., Danbury, CT (US)

(*) Notice: Subject to any disclaimer, the term of this patent is extended or adjusted under 35 U.S.C. 154(b) by 308 days.

This patent is subject to a terminal disclaimer.

(21) Appl. No.: 12/712,735

(22) Filed: Feb. 25, 2010

(65) Prior Publication Data

US 2011/0206581 A1  Aug. 25, 2011

(51) Int. Cl.
*B01D 53/04* (2006.01)

(52) U.S. Cl. ............... 95/96; 96/121; 96/149; 422/211; 422/218; 422/240

(58) Field of Classification Search ............... 95/90, 96; 96/121, 131, 149; 141/1, 285, 286; 422/129, 422/211, 218, 240
See application file for complete search history.

(56) References Cited

U.S. PATENT DOCUMENTS

| | | | |
|---|---|---|---|
| 4,541,851 A * | 9/1985 | Bosquain et al. | 96/126 |
| 5,372,792 A * | 12/1994 | Mueller et al. | 422/218 |
| 5,759,242 A * | 6/1998 | Smolarek et al. | 96/149 |
| 5,814,129 A * | 9/1998 | Tentarelli | 95/90 |
| 5,827,485 A * | 10/1998 | Libal et al. | 422/179 |
| 5,836,362 A | 11/1998 | Ackley et al. | |
| 5,882,285 A * | 3/1999 | Seto et al. | 483/29 |
| 5,882,385 A | 3/1999 | Bosquain et al. | |
| 6,086,659 A * | 7/2000 | Tentarelli | 96/131 |
| 7,128,775 B2 | 10/2006 | Celik et al. | |
| 7,214,352 B2 * | 5/2007 | Poussin | 422/218 |
| 8,101,133 B2 * | 1/2012 | Ackley et al. | 422/218 |
| 2006/0254420 A1 * | 11/2006 | Monereau et al. | 95/96 |
| 2008/0161617 A1 * | 7/2008 | Riley | 585/323 |

FOREIGN PATENT DOCUMENTS

| | | |
|---|---|---|
| DE | 3939517 A1 | 6/1991 |
| DE | 3939518 A1 | 6/1991 |
| DE | 19600549 | 7/1997 |
| DE | 19735389 C1 | 9/1998 |

(Continued)

OTHER PUBLICATIONS

Grenier et al., "Adsorption Purification for Air Separation Units", *Cryogenic Processes and Equipment*, ASME (1984), pp. 143-148.

(Continued)

*Primary Examiner* — Duane Smith
*Assistant Examiner* — Minh-Chau Pham
(74) *Attorney, Agent, or Firm* — Salvatore P. Pace

(57) ABSTRACT

A radial flow reactor vessel is disclosed for use in gas purification, separation or reaction processes and most suitably used in prepurification processes. The reactor has internal baskets for confining a bed of active material. The baskets are rigidly supported at both the top and bottom ends of the reactor and have walls that are axially flexible and radially rigid. The vessel has multiple movable support columns designed to facilitate pre-stressing of the baskets to offset axial compressive loads induced from thermal cycling.

26 Claims, 7 Drawing Sheets

FOREIGN PATENT DOCUMENTS

GB 810700 3/1959

OTHER PUBLICATIONS von Gemmingen, "Designs of Adsorptive Driers in Air Separation Plants", *Reports on Science & Technology*, No. 71 (1994), pp. 8-12.

Chang, H.C. et al., "Design Criterion for Radial Flow Fixed-Bed Reactors", *AIChE Journal*, vol. 29, No. 6, pp. 1039-1041 (1983).

Ergun, S., "Fluid Flow Through Packed Columns", *Chem. Engr. Progress*, vol. 48, pp. 89-94 (1952).

Green, et al., "Fluid and Particle Dynamics", *Perry's Chemical Engineers' Handbook*, 8th Ed., pp. 6-32 to 6-34 (2008).

Heggs, P.J., et al., "The modeling of fluid-flow distributions in annular packed beds", *Gas Sep. Purif.*, vol. 8, No. 4, pp. 257-264 (1994).

Heggs, P.J., et al., "Evaluation of pressure profiles and overall pressure drop for flow through annular packed bed configurations", *Gas Sep. Purif.*, vol. 9, No. 3, pp. 171-180 (1995).

Heggs, P.J., et al., "Prediction of flow distributions and pressure changes in multi-layered annular packed beds", *Gas Sep. Purif.*, vol. 9, No. 4, pp. 243-252 (1995).

Kareeri, A.A., et al., "Simulation of Flow Distribution in Radial Flow Reactors", *Ind. Eng. Chem. Res.*, vol. 45, pp. 2862-2874 (2006).

\* cited by examiner

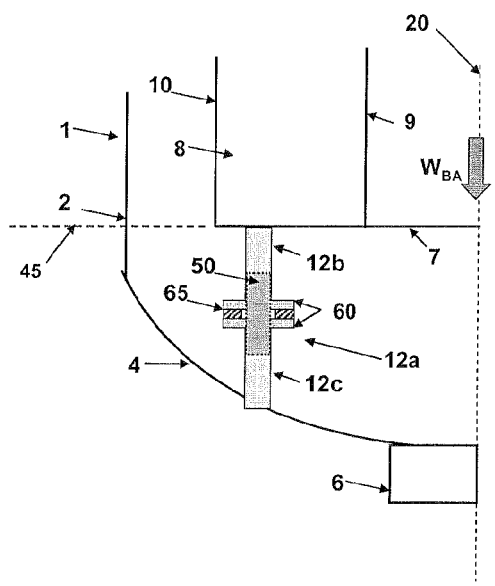
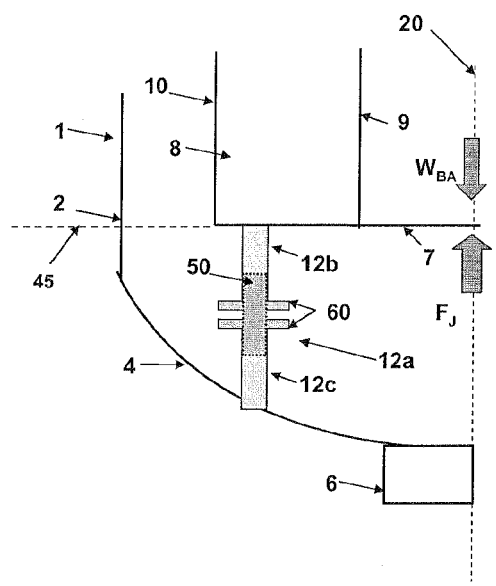
FIG 6a
FIG 6b
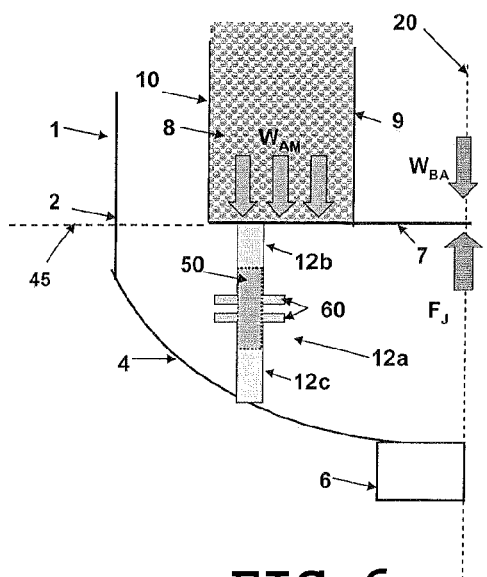
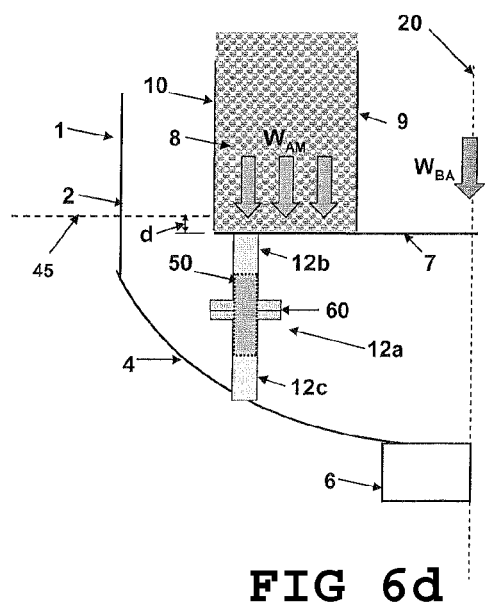
FIG 6c
FIG 6d

RADIAL FLOW REACTOR WITH MOVABLE SUPPORTS

FIELD OF THE INVENTION

The present invention relates generally to the field of radial flow reactor vessels used in gas purification, separation, and reaction processes. More specifically, this invention relates to radial flow vessels having internal basket assemblies to retain active material used to remove and/or convert one or more components in a feed stream through adsorption and/or catalytic or non-catalytic reactions and having movable support columns.

BACKGROUND OF THE INVENTION

The demand for higher reactor throughput continues to increase for a variety of industrial processes linked to oil and gas recovery, alternative fuel production, sustainability of the environment and process emissions. Such demands are partially driven by the ever-increasing cost of fuel and the need for various chemical feed stocks. One example is the demand for larger cryogenic air separation units (ASUs) to meet the growing needs for large quantities of oxygen and nitrogen used in various industrial process industries. ASUs require front end purification reactors (adsorption vessels) to purify the feed air stream by removing carbon dioxide, water, trace hydrocarbons and other contaminants prior to entering the ASU. Larger ASUs require larger "prepurification units", as they are commonly known to treat the incoming feed air prior to cryogenic distillation. This presents a challenge to reactor designers when trying to control the size of the reactor since higher throughput of feed air demands a proportional increase in the frontal flow area provided by the vessels resulting in larger, more costly vessels.

Gas purification, separation or reaction processes using active materials such as adsorbents and/or catalysts are well known in the art and there are several reactor vessel designs in use today for these types of processes. Examples include both vertically and horizontally oriented cylindrical vessels with upward air flow through the bed of adsorbent material, reactant and/or catalytic material during purification, separation or chemical reaction. A third type of vessel, as employed herein, is oriented with a vertical central or longitudinal axis and an internal design that directs the process gas flow radially through the bed. This radial flow design consists of a pressure vessel enclosing gas permeable concentric inner and outer baskets to contain a bed of one or more layers of active material. Radial flow designs offer the ability to increase frontal flow area by increasing the height of the vessel without substantially altering the vessel footprint (ground area requirements). Furthermore, a radial flow design offers a more efficient means of increasing flow area for a compared to either horizontal or axial flow reactor designs.

Radial flow reactors typically operate continuously or in cyclic mode, depending upon the gas treatment process. Many processes, such as adsorption processes, operate cyclically in either pressure swing (PSA), vacuum swing (VSA), temperature swing (TSA) mode or in combinations of these modes wherein one or more components of the feed stream are adsorbed during the adsorption step and then desorbed or otherwise flushed from the adsorbent during the adsorbent regeneration step. When thermal variations accompany these cyclical processes, such as in TSA processes, the changes in temperature cause bed and vessel components in contact with such thermal variations to expand and contract. Depending upon the configuration of the internal components, as well as their manner of connection to the vessel, these thermal expansion and contraction induce loads within the bed are subsequently transferred to the internal components of the reactor. Such thermally induced loads create significant mechanical stresses on all elements of the internal basket assemblies, the magnitude of such induced loads increases with increasing temperature difference. Axial and radial displacement of the basket walls may also result in compression of the bed of active material and the material particles may migrate or be damaged as a result of the basket wall movement. In the worst case, these effects can cause physical breakdown of the active material and/or mechanical failure of the basket assemblies.

By way of example, the particular problems associated with radial flow reactors are more fully described in a typical thermal swing air purification process. It is advantageous to operate such a reactor by introducing the feed air into the outermost passage between the vessel shell and the outer basket during the adsorption step and by introducing the regeneration gas into the passage enclosed by the inner basket during the desorption step. Thus, feed air is purified by passing radially through the adsorbent bed toward the central axis of the reactor. Regeneration gas passes radially through the bed in the opposite direction to desorb the contaminants and renew the bed for the subsequent cycle. Adsorption of the contaminants from the feed gas occurs at substantially ambient temperature. Regeneration is performed using a thermal pulse wherein heated gas is first introduced for a specified time followed by cold gas, where the cold gas is at about the same temperature as the feed gas. During the heating phase of regeneration, a heat front develops at the inner basket wall and then travels outwardly and radially through the bed. The part of the bed ahead of the heat front remains near ambient temperature, while the part of the bed already traversed by the heat front is at the hot regeneration temperature. When this heat front reaches an intermediate radial position within the bed, the cold gas is introduced to the inner basket space. This gas is warmed as a cold front develops at the rear of the heated zone. The resultant thermal pulse then continues to push the heat front through the remaining adsorbent as the stored energy is consumed by desorbing the remaining contaminants in the bed. The vessel shell and heads remain predominantly at ambient temperature during the entire operation of a cycle, i.e. the ends and shell of the vessel have little contact with the hot gas, remaining at a relatively constant temperature over each cycle, and therefore remain fixed in space. Conversely, the internal components of the reactor experience these temperature variations directly, resulting in thermal expansions and contractions and the associated induced loads and stresses.

The reactor and its internal components must therefore be designed to minimize and accommodate radial and axial movement so that the mechanical integrity of the basket assemblies and the active material contained within the baskets is maintained throughout the thermally induced loads and stresses. Further, the thermally induced mechanical stresses limit the temperature range over which conventional radial flow reactors may operate and these limitations are amplified as the size of the reactor increases thereby limiting the size and application of the reactors.

Thus, there is significant motivation to improve the mechanical design of radial flow reactors to affect greater operational reliability, lower cost and increased process flexibility while still limiting the overall footprint of the reactor vessel. Further, the present reactor is designed to permit a simple and effective means for addressing the problems associated with thermally induced mechanical stresses and thereby enable the aforementioned improvements.

The teachings in the art are varied and inconsistent with respect to the design of radial flow reactors; particularly for vessels undergoing thermal cycling. Conventional cylindrical reactor designs typically include an internal assembly of at least two concentric porous wall baskets with the active material contained in the annular space formed between these baskets. The baskets and vessel shell generally share the same longitudinal axis. Beyond these commonalities, the teachings diverge significantly in describing a variety of means to support the basket assembly. For example, the baskets are either suspended from only the top end of the vessel, supported at only the bottom end, or fixed between both ends of the vessel.

U.S. Pat. No. 4,541,851 discloses a vessel having two concentric layers of adsorbent, each layer contained between two concentric cylindrical grates. Three cylindrical grates are concentric about the same longitudinal axis as the vessel enclosing them. The intermediate grate is axially rigid and radially flexible while the inner and outer grates are axially flexible and radially rigid. All three grates are interconnected rigidly to the vessel shell at their upper end and interconnected rigidly to a solid floating bottom plate at their lower end. The assembly of the three concentric grates is thus suspended inside the vessel from the top head so that the weight of the grates, bottom plate and the adsorbent material is primarily carried by the axially rigid intermediate grate. The intermediate grate expands and contracts in the axial direction. The axial movement of the flexible inner and outer grates follows that of the intermediate grate. The inner and outer grates expand and contract in the radial direction and alternately squeeze and release the adsorbent bed in the radial direction upon heating and cooling. The intermediate grate expands/contracts radially within the bed since it is flexible in the radial direction, and, as a result, imparts very little additional radial squeezing force on the adsorbent bed.

U.S. Pat. No. 4,541,851 discloses in a second embodiment a vessel having three concentric layers of adsorbent and four permeable grates. The inner and outer grates are rigid in both the axial and radial direction and the two intermediate grates are rigid in the axial direction and flexible in the radial direction. All four grates are interconnected rigidly to the shell at their lower ends. At their upper ends, all four grates are free to move in the axial direction with the three outer grates able to slide axially in guides, while the innermost grate terminates in a dome that is able to move freely in the axial direction. Two or more layers of adsorbent can be used in this configuration. As thermal pulses move through the adsorbent bed, the grates alternately are heated and cooled. The design allows each of the grates to expand freely and independently of each other in the axial direction. The radial squeezing forces are transmitted to all three layers of adsorbent because of the circumferential flexibility of the two intermediate grates. Additional details are associated with this design are described by Grenier, M., J-Y Lehman, P. Petit, "Adsorption Purification for Air Separation Units," in Cryogenic Processes and Equipment, ed. by P. J. Kerney, et al. ASME, New York (1984).

U.S. Pat. No. 5,827,485 discloses a vessel containing an annular adsorption bed which is bounded by inner and outer baskets. A single layer of adsorbent is taught which is contained between the two permeable concentric baskets, both of which are flexible in the axial direction and rigid in the radial direction. At least one of the baskets is rigidly fastened to the top end of the vessel. The inner basket is rigidly connected at its lower end to a bottom support member and further supported on lower a hemispherical cap of the shell by ribs arranged like a star. The outer basket is directly supported at its lower end by the bottom cap. A ratio of coefficients of thermal expansion of the baskets relative to that of the "free flowing" active material or adsorbent is claimed to be in the range of 0.25-2.0. It teaches that this combination of features essentially eliminates the relative motion of particles of the free flowing material due to the thermal cycling of the baskets. It also suggested that pre-stressing at least one of the baskets reduces the axial stresses that develop within the baskets as a result of thermal cycling, although no description of the method to pre-stress is provided. Additional details are also described by U. von Gemmingen, "Designs of Adsorptive Dryers in Air Separation Plants", *Reports on Science & Technology*, 54:8-12 (1994).

U.S. Pat. No. 6,086,659 discloses a radial flow adsorption vessel that has a plurality of grates, wherein at least one of the grates is flexible in both the axial and radial directions. This "bidirectional flexibility" is preferably imparted to at least one of the intermediate grates. Many combinations of axial/radial flexibility/rigidity are offered for the inner and outer baskets. The grates are rigidly attached to both the top of the vessel and to a bottom plate. The bottom plate may be floating or semi-rigidly or rigidly attached to the bottom head of the vessel. One or more intermediate grates are disclosed as a means to contain various layers of adsorbents within the vessel.

German Patent No. DE-39-39-517-A1 discloses a radial flow vessel having a single layer of adsorbent contained between two concentric permeable grates, both of which appear to be rigid in both the axial and the radial direction. The outer basket is rigidly connected to the top end of the vessel and to a floating bottom plate. The inner basket is flexibly connected to the top end of the vessel through the use of an expansion bellows or a sliding guide. The lower end of the inner basket is connected rigidly to the floating bottom plate. The entire basket assembly is thus suspended from the top end of the vessel with the outer basket carrying the weight of the assembly and the adsorbent contained therein. The inner grate is enclosed on the adsorbent side with a gas permeable compressible material or mat to absorb any radial compressible forces resulting from thermal expansion and contraction.

As illustrated above, the patent art teaches many variations within basic design configurations wherein inner, outer, and/or intermediate baskets may possess axial flexibility, radial flexibility, or combinations thereof. All of these designs have various deficiencies, most notably a continuing problem with thermally induced stress, shearing, and possible damage to the equipment and active material. Notwithstanding these teachings, there is no clear direction for the design of a radial flow reactor to mitigate or eliminate these problems. Moreover, there are no teachings on methods for pre-stressing the internal baskets or on reactors designed for this purpose.

The present radial flow reactor is designed such that the internal basket assembly containing the bed of active material is rigidly supported at both the top and bottom ends of the vessel. The size and geometry of the perforations in the basket walls largely dictate the amount of axial flexibility and radial rigidity that results to minimize thermally induced movement and to control stresses and loads, thereby mitigating axial and radial buckling of these walls. The present reactor also provides a simple and advantageous means of pre-stressing the baskets which is used herein to describe the act of placing the baskets in tension at ambient temperature.

BRIEF SUMMARY OF THE INVENTION

The present invention is a radial flow reactor used in gas separation processes and particularly for purification of air by adsorption and/or a catalytic or non-catalytic reaction. The reactor has two concentric porous internal baskets which confine the active material, typically a free-flowing particulate solid, within the baskets and within the cylindrical shell. The baskets are rigidly supported at both the top and bottom ends of the vessel and have walls that are axially flexible and radially rigid to minimize thermally induced stresses and loads. The reactor vessel has support columns that are affixed to a bottom plate which is affixed to the bottom of the baskets and are movable. Preferable, the support columns are a split support column assembly that provides means to simply and effectively pre-stress the internal baskets, defined as the act of placing the baskets in tension at ambient temperature, thereby mitigating the adverse effects of thermally induced mechanical stresses.

The force required to pre-stress the baskets to the proper pre-tension is captured with the reactor vessel positioned upright in it operating orientation by utilizing the inherent mass of the solid active material loaded in the bed between the concentric baskets. The bottom support plate is affixed to split column supports (support columns), and moves with the upper sections of these supports permitting pre-stressing of the baskets. Combining the basket design with the split column support system provides a means to apply a predetermined amount of pre-stress during the loading of the active material, the act of filling the bed, thereby significantly mitigating thermally induced mechanical stresses and reactor size limitations.

Thus, the present invention represents a more reliable design of a radial bed reactor vessel with an internal basket assembly. Not only is a pre-stressing method provided, but a support column is provided for the basket assembly that enables pre-tensioning of the baskets by either mechanical means or by using the resident force potential of the weight of the active material.

According to one embodiment of the present invention, a radial bed reactor is provided comprising:
a) a substantially cylindrical vessel shell having a longitudinal axis, an upper cap and a lower cap;
b) a substantially cylindrical porous outer basket disposed concentrically inside the shell along the longitudinal axis and attached to the upper cap of the shell;
c) a substantially cylindrical porous inner basket concentrically inside the porous outer basket along the longitudinal axis and attached to the upper cap of the vessel,
d) a bottom support plate disposed inside the shell and connected to the bottom of inner and outer baskets so as to form a solid bottom surface of the baskets;
e) at least one layer of active material distributed around the longitudinal axis in the annular space formed between the concentric baskets; and
f) at least three support columns disposed between the bottom support plate and the lower cap of the vessel with means for moving the bottom support plate and baskets along the longitudinal axis to provide a predetermined longitudinal tension to the baskets.

In another embodiment of this invention, a cyclic gas reaction process using the inventive radial bed reactor is provided.

In another embodiment of this invention, a method is provided for pre-stressing at least the outer basket in the radial flow reactor.

In yet another embodiment of this invention, a split support column is provided for used in the radial flow reactor.

BRIEF DESCRIPTION OF THE DRAWINGS

For a more complete understanding of the present invention, reference should be made to the following Detailed Description taken in conjunction with the accompanying drawings in which:

FIGS. 6a-6d are partial views of the lower vessel and basket and support column assemblies illustrating the steps in pre-tensioning the baskets of the embodiment of FIG. 1;

DETAILED DESCRIPTION OF THE INVENTION

Figure 1:
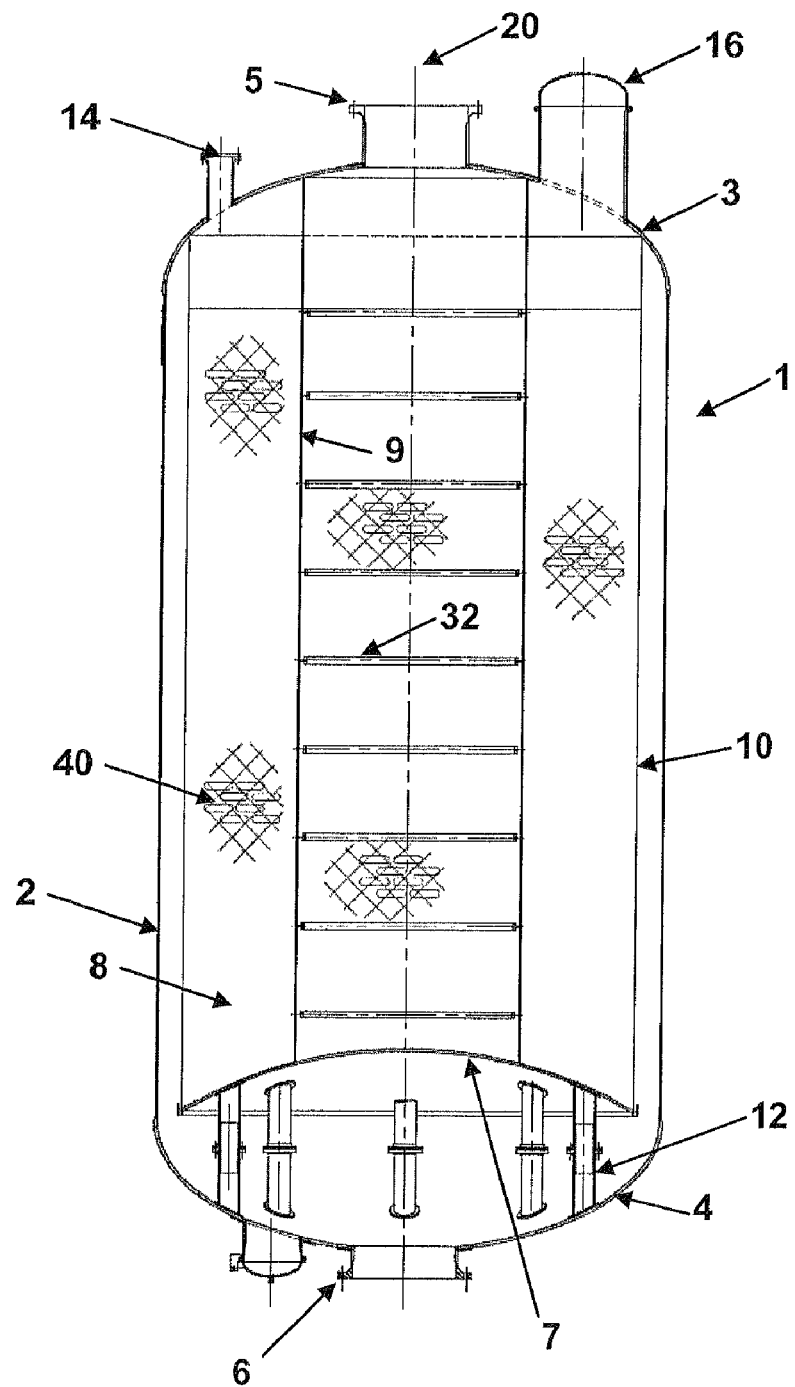
FIG. 1 is a cross sectional view of the radial flow reactor vessel of one embodiment of this invention.
Figure 2:
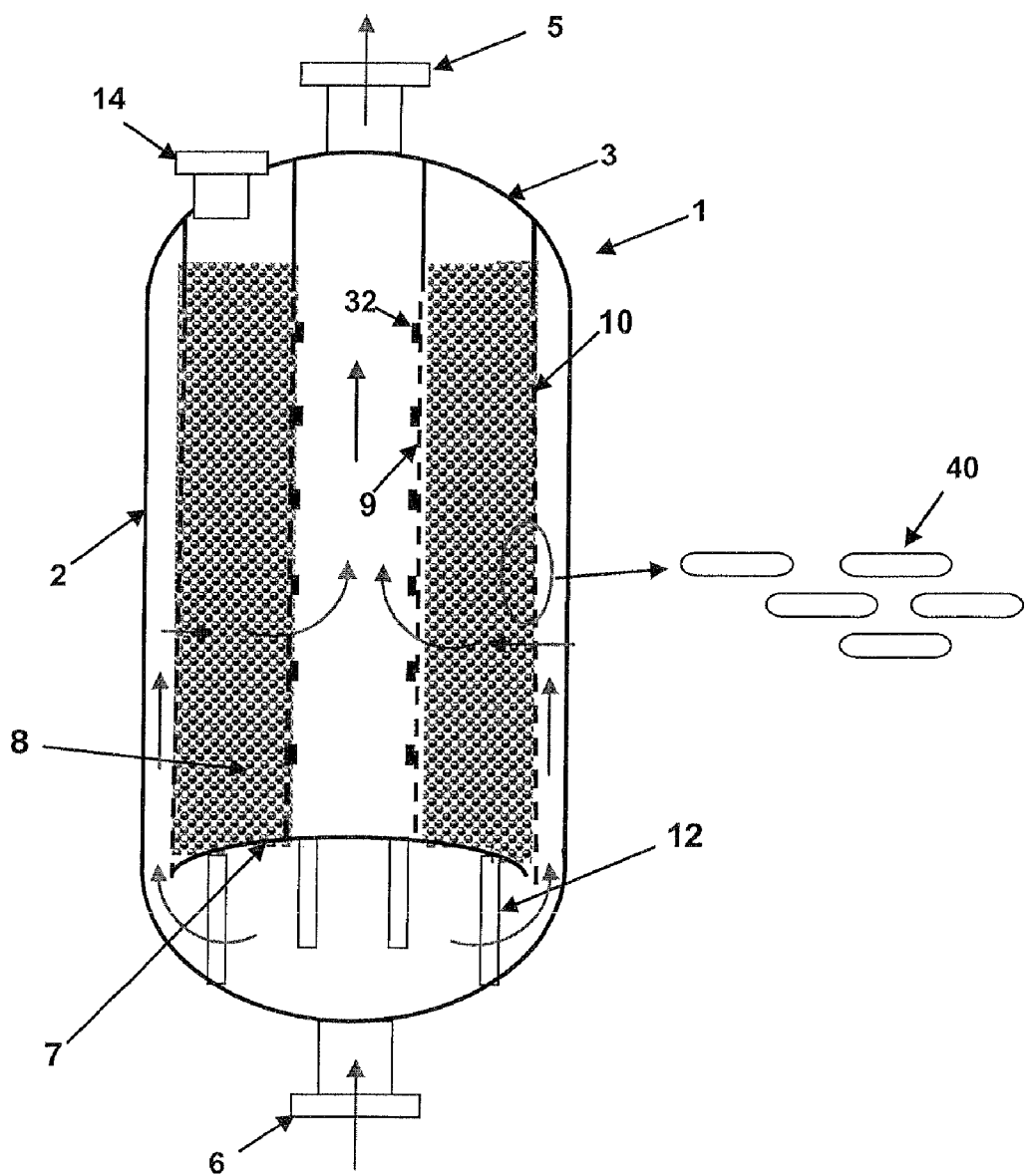
FIG. 2 is a schematic of the radial flow reactor vessel of FIG. 1 showing the flow paths through the reactor.
Figure 3:
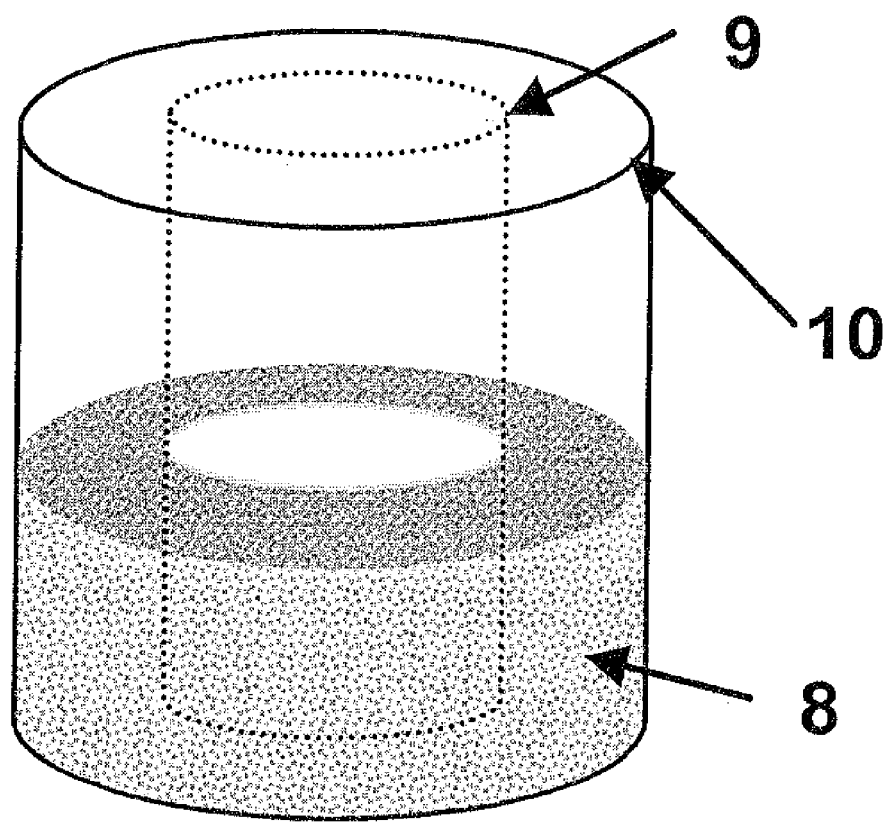
FIG. 3 is an illustration of the internal baskets and bed within the reactor vessel as shown in FIG. 1.

FIGS. 1-7 illustrate the basic structure of one embodiment of the radial flow pressure vessel of this invention and certain of its components. The cross-sectional view of FIG. 1 illustrates the essential features of this embodiment and of the invention, but does not show all fastener means, conduits and apparatus details or other aspects of the invention which are understood and readily apparent to one skilled in the art. FIG. 2 is a schematic of the vessel showing essentially the same features as in FIG. 1 and additionally the gas flow path through the vessel. The Figures do not represent actual dimensions.

Referring to FIG. 1, a substantially cylindrical radial flow reactor vessel (1) on a vertical longitudinal axis (20). The vessel has an outer shell (2) with upper (3) and lower (4) hemispherical caps as generally known in the industry. Lower cap (4) has inlet (6) for receiving a feed gas and upper cap (3) has outlet (5) for the exit of the product gas in normal operation. In prepurification processes, atmospheric air would be introduced through inlet (6) and treated or purified air would exit outlet (5).

Within shell (2) is a bed (8) containing active material which is confined between two concentric cylindrical containment members, hereafter referred to as "baskets" (9, 10). The basket arrangement is best understood by viewing FIG. 3 which illustrates the spacial relationship of inner basket (9), outer basket (10), and bed (8). It is preferred to use only two baskets oriented concentrically about the same primary longitudinal axis of the reactor vessel (1) as shown because this simplifies the structural design of baskets (9, 10) and allows easy access to the entire annular space of bed (8) between the inner and outer baskets for loading and replacing the active material, e.g. utilizing fill-ports (14) and/or man way (16) as shown in FIG. 1. As well understood, man way (16) permits the ingress and egress of operators and repairmen into the bed (8). The term "bed" as used herein describes both the space between the baskets (9, 10) which would contain the active material and the space with active material present. In operation, process gas is fed in a substantially radial direction through bed (8) with respect to the longitudinal axis of symmetry of the reactor vessel as described above.

Referring again to FIG. 1, baskets (9,10) are rigidly affixed and closed at their bottom or lower ends by bottom support plate (7), wherein the combined components (7, 9 and 10) comprise the basket assembly containing bed (8). The bottom support plate is affixed to column supports (12). As explained in more detail below, the substantially vertical column supports (12) are all split to allow a predetermined displacement of the bottom support plate (7) from its reference position after fabrication to a lower position to provide tension to the baskets, such as after adsorbent or material loading so as to stretch and pre-stress the basket walls. The design shown in FIG. 1 utilizes eight (five shown) support columns (12), although fewer or more columns may be employed. At least three support columns are preferred. Some or all of the support columns incorporate a guide means (as further described below) to insure that the longitudinal axes of baskets (9, 10) and the entire basket assembly remains coincident with the longitudinal axis of the vessel (1). The outside of concentric inner basket (9) and the inside of concentric outer basket (10) represent the boundary walls of the bed (8). Baskets (9, 10) have non-permeable, solid sections that are rigidly affixed to upper cap (3). Likewise, short solid sections of the baskets (9, 10) may also be utilized at the bottom of the basket assembly where the baskets are rigidly attached to the bottom support plate (7). The remaining and majority of the surface area of the basket walls (9, 10) are gas permeable or otherwise porous as described below. Upper cap (3) has ports (14) positioned and spaced uniformly over annular bed (8) to facilitate loading of the active material. One of the ports may be replaced by a man way (16) as shown.

The vertical walls of the baskets (9, 10) are perforated over a majority of their length to make them permeable to gas flow and to impart structural characteristics such that the baskets attain axial flexibility and radial rigidity to minimize movement and to control the stresses and loads that are thermally induced during operation. Permeable sections of the basket walls are preferably fabricated using perforated metal sheets, welded and rolled into cylinders. The metal is typically steel or steel alloy, selected based upon physical properties, ease of perforating, corrosion resistance, weldability and cost requirements. The thickness of the basket wall materials depends upon several structural considerations, as would be understood by one skilled in the art, and the selected material and its thickness need not be the same for the inner and outer baskets. Typical basket wall thickness, however, would be between 3 mm and 35 mm.

Figure 4:
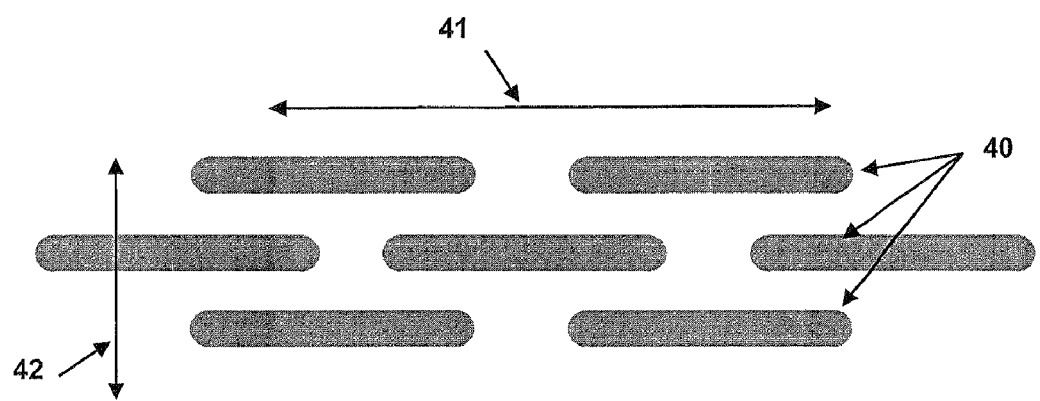
FIG. 4 is a cut out view from the basket wall shown in FIG. 1.

One skilled in the art recognizes that while the basket walls must be gas permeable or porous (perforated) to allow fluid flow, the particular size, shape and orientation of the holes or perforations will influence the directional flexibility of the basket walls. For example, and as best illustrated in FIGS. 2 and 4, it is known that a slotted perforation design with elongated slots (40) staggered and oriented horizontal or tangential relative to the vertical (longitudinal) vessel axis provides axial flexibility (see arrow 42) and radial rigidity (see arrow 41). Radial rigidity is achieved from the periodic continuous and intregral bands or webs of solid metal that extend around the circumference of the basket wall. Conversely, there is no uninterrupted strip or web of solid metal of the basket wall in the axial (vertical) direction due to the staggered pattern of horizontally oriented elongated slots (40). Such a configuration is important when the inner (9) and outer (10) baskets are fixed at both the top and bottom of the vessel (1) as in the present invention. Thus, at higher temperatures elongated slots (40) compress to absorb the axial expansion, relieving some of the axial compressive stress that would result otherwise. However, this axial flexibility (as determined by the effective modulus of elasticity) must not be so great as to allow buckling of the basket wall due to axial compressive stresses, herein also referred to as "axial buckling." While many different perforation geometries are possible, one skilled in the art knows that geometries must be selected to allow sufficient open flow area while simultaneously creating an effective modulus of elasticity of the basket material to result in the desired axial flexibility and radial rigidity. For the purpose of the present invention, the general slotted perforation configuration shown in FIG. 4 is preferred, but the specific dimensions and spacings of the slots are to be selected based upon the specific basket material and the degree of structural flexibility desired.

It has also been found through structural analysis that stiffening ribs (32) are preferably added and attached to the inner basket (9) to mitigate buckling due to the external pressure applied by the active material, herein also termed "radial buckling." The stiffening ribs (32) are typically structural supports made of metal or other rigid material (preferably with the same thermal expansion characteristics as the inner basket material) that are placed on the inside wall of inner basket (9) such that each rib lies in a horizontal plane and extends continuously around the circumference of inner basket (9). Stiffening ribs (32) are spaced at regular intervals to increase the basket stiffness so as to resist the radial squeezing forces resulting from thermal cycling of the baskets and enclosed bed.

Figure 5:
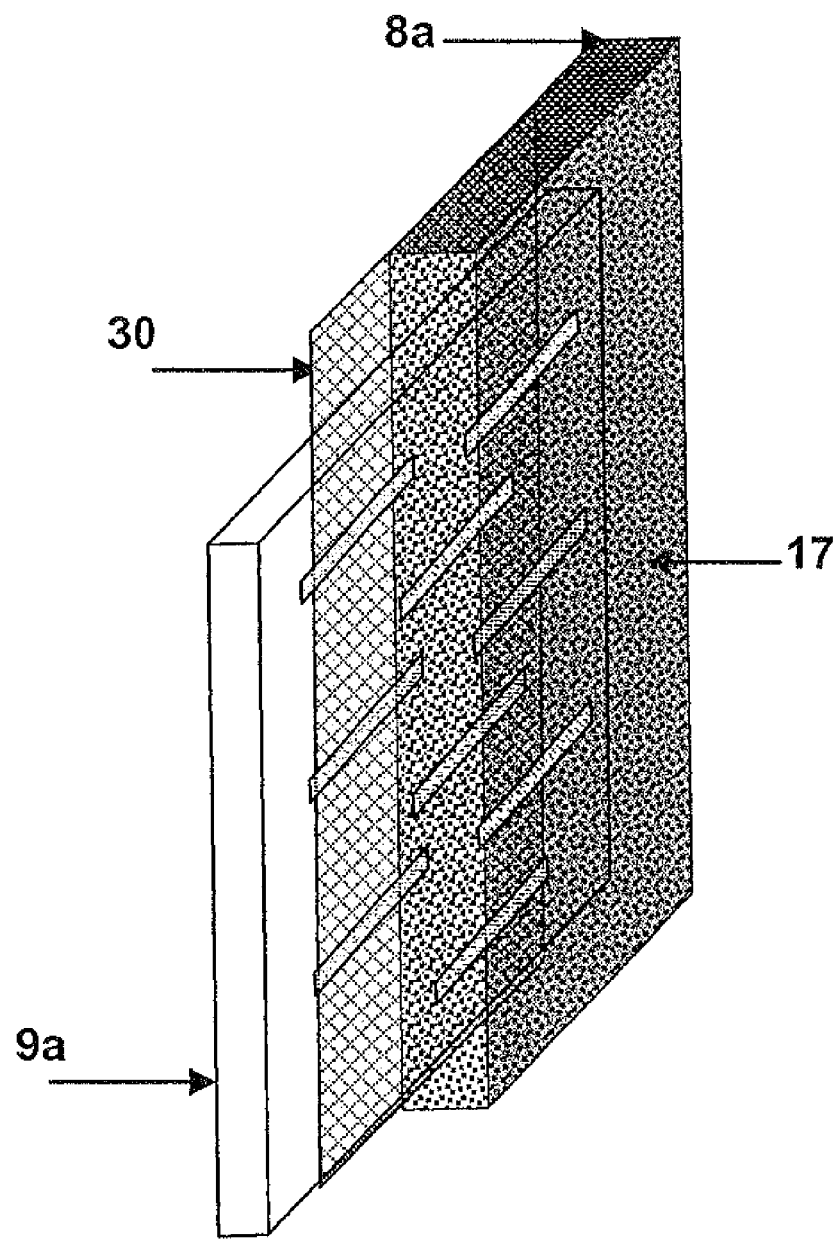
FIG. 5 is a partial illustration of one basket wall with screen and bed of the radial flow reactor vessel of one embodiment of this invention.

The active material may be further contained and/or divided within bed (8) using metal or other porous and flexible materials. For example, screens can be used to line the perforated metal walls of the baskets when the perforations or slots are larger than the particle size of the active material such as illustrated in FIG. 5. FIG. 5 shows a preferred configuration wherein the wall of inner basket (9a) is made of a perforated metal sheet in contact with a screen (30) in contact with bed (8a) containing active material (17). Although not shown, the opposite side of bed (8a) would be in contact with the inside wall of outer basket (10) which can also have a screen there between. Similar screens may also be used to separate different active materials into two or more layers within the bed (8a) if desired. The screens are flexible and are not intended to support significant axial loads and may be made from woven or non-woven metallic or non-metallic materials such as wire screens, fabric mesh, expanded metal mesh, open cell foam, polymeric materials and the like.

Depending upon the type of gas treatment process, the active material may need to be regenerated at regular intervals in a repeating cyclic manner. During this process, a regeneration gas is introduced to the vessel and flows radially through the bed of active material before exiting. The path of the regeneration flow is typically reversed relative to the path of the feed flow. For reactor vessels of the present invention, the gases always flow radially through the active material, regardless of where the feed and regeneration gases enter the vessel.

Again referring to FIG. 2, feed gas enters the bottom of the reactor (1) at inlet (6) and is directed into an outer channel formed between the shell (2) and the outside wall of outer basket (10). The feed gas then flows radially through the wall of outer basket (10), through bed (8) and the active material contained therein and exits through the wall of inner basket (9) into a central channel aligned with the vertical axis of vessel (1). The product gas (or purified gas) exits reactor vessel (1) through outlet (5) of the vessel (1) as shown. The reactor vessel (1) can be designed to have feed gas enter either at the bottom, inlet (6), or the top, outlet (5), of the vessel such that the radial flow of the process gas through bed (8) may be either inward or outward, respectively. Cyclic processes typically direct the feed and regeneration flows countercurrent to each other. For example, if feed flow is directed radially inward then regeneration flow would be directed radially outward.

When radial flow reactors like the present invention are utilized in conjunction with a thermal swing regeneration step, or with other thermal cyclic processes to clean or reactivate catalytic material, the internal baskets contract and expand with the decrease and increase in temperature of the gas treatment process, respectively, as described above. Such thermal expansions and contractions of the baskets occur both radially and axially relative to the longitudinal axis of the reactor vessel, inducing stresses in the baskets and all internal components and fixture means. In the present invention, the baskets are constrained at the top and the bottom of the vessel. Under such constrained support, significant internal stresses will develop within the porous basket walls in response to the cyclic temperature variations.

When the thermally induced axial stresses approach or exceed the predetermined allowable stress limits for axial buckling, as determined from the basket material properties and perforation geometry, then it is preferred to pre-stress the porous walls of the internal basket to offset the effects of these induced axial loads. Such pre-stressing is applied axially (parallel to the longitudinal axis of the cylindrical pressure vessel) and in such a way to offset the thermally induced stress. Because the present baskets are constrained at the top and bottom, the induced thermal stress is compressive. Pre-tensioning the baskets offset, at least partially, these thermally induced compressive stresses. Thus, the initial temperature rise of the porous wall serves to relieve the pre-stress (pre-tension) in the basket since the thermally-induced axial compressive stress acts opposite to the tensile pre-stress. Once the pre-tension is completely relieved, the compressive axial stress may continue to develop in the porous basket walls as temperature increases further. However, the resulting maximum compressive stress is less than it would have been if the pre-tensioning had not been applied, i.e. the compressive stress is offset by the amount of tensile pre-stress. Depending upon the amount of pre-stress applied to the baskets, it is possible to control the maximum resulting stress at the heated condition to be zero, or to be tensile or compressive.

Thus, in addition to selecting the material properties and perforation geometry of the baskets, it has now been found that pre-stressing at least the outer basket (10) is necessary to insure against axial buckling due to the compressive stresses that develop during the heating of basket (10) and its components. While the art provides no specific teaching as to the methods for pre-stressing the baskets, the present invention introduces a simple method based upon a split column support design within the reactor vessel. While various mechanical methodologies for pre-tensioning the porous basket walls may be applied, the preferred method of this invention is to utilize the inherent weight of the active material as described below. Hence the design of the present reactor vessel provides the means for an easier and effective method to achieve such pre-stressing.

Pre-stressing the baskets mitigates or eliminates the axial compressive stress on the baskets caused by thermal expansion during the elevated temperature part of the process cycle. Outer basket (10), due to its larger diameter and relatively smaller thickness, is particularly subject to axial buckling from the induced thermal loads and is pre-stressed herein. Preferably, both inner and outer baskets are pre-stressed simultaneously. Alternatively, the outer basket (10) may be pre-stressed independently by temporarily disconnecting the inner basket (9) from the upper cap (3) of vessel (1), e.g. as may be advantageous in certain alternative means of loading active material into the vessel. In addition to preventing axial buckling, pre-stressing the baskets allows thinner basket wall construction and/or may extend the maximum allowable operational temperature if desired.

Before describing the pre-stressing method, further description of the vessel is needed. As shown in FIG. 1, the lower ends of baskets (9, 10) are affixed to movable bottom support plate (7) which is made from solid, non-porous metal material. Support plate (7) is rigidly connected to the lower cap (4) of vessel (1) through multiple split support columns (12). Referring now to FIG. 6a, a fragmentary schematic view of vessel (1) is shown with one representative support column (12a) split to form a column assembly comprised of two separate support members (12b and 12c) each having an opposing and connecting flange (60). In the description that follows regarding FIG. 6, it is to be understood that all of the support columns (12a) behave the same as the representative support column shown in the FIGS. 6a-6d. The assembly comprising support columns (12a) also includes a cylindrical guide means (50) to prevent lateral movement and maintain the basket assembly concentrically aligned along the vessel axis during fabrication and during operation. Spacers (65), placed between the flanges (60), are further described below. In the embodiment shown in FIG. 6, the guide means (50) is a simple pipe inserted inside the columns (12b and 12c). The bottom of support member (12c) is affixed to lower cap (4) of vessel (1) and the upper end of support member (12b) is affixed to bottom support plate (7). Bottom support plate (7) is shown schematically in FIG. 6 as a flat plate for simplicity, but typically this plate is designed to be concave toward cap (4) as shown in FIG. 1.

Figure 7A:
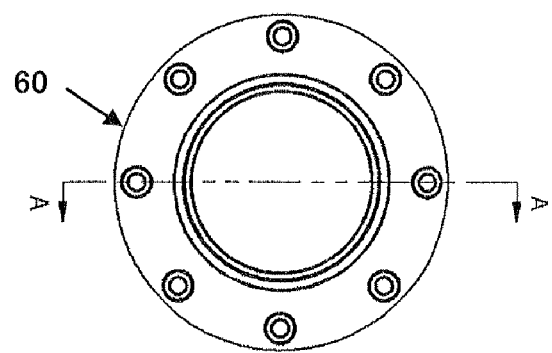
FIG. 7(a) is a top view of one flange attached to a split column support member of FIG. 7.
Figure 7:
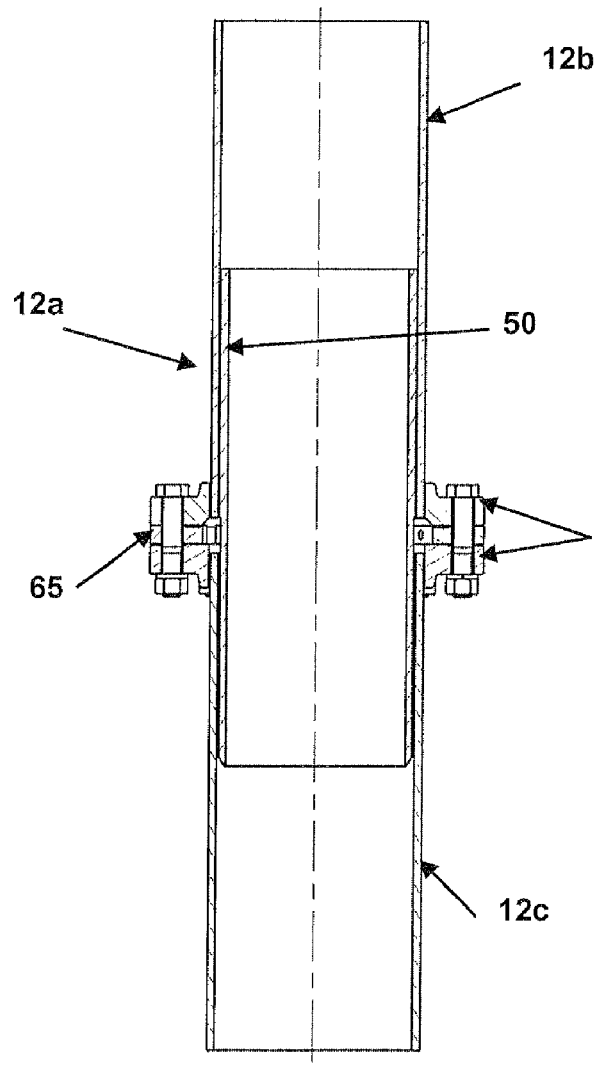
FIG. 7 is a cross sectional view of one split column support used in the embodiment of FIG. 1.

The assembly of support column (12a) shown in FIG. 6 is shown in greater detail in FIG. 7. Cylindrical guide member (50) is sized to slidably engage the internal space of split column support assembly (12a) in a pipe-within-a pipe configuration and is affixed to one of the support members (12b or 12c), preferably to support member (12b). Guide member (50) engages both support members (12b and 12c) and is of a length preferably no more than ⅓ the total length of split column support assembly (12a). Together, support members (12b and 12c), opposing flanges (60) and guide means (50) form the split support column (12a). Other methods of slidably engaging the support members can also be employed. The number of support columns required depends upon the combined static and dynamic loads to which the basket assembly is subjected, as well as the design of the individual columns. Typically, at least three columns are required and they should be spaced uniformly and symmetrically relative to the longitudinal axis of the vessel. Guide members are required in at least 50% of the support column, for example, if eight columns are used as in the design of FIG. 1, then at least four columns should include a guide means.

The pre-stressing process is conducted using the split column supports. In the preferred method, the substantial weight of the active material loaded into bed (8) is utilized to pre-tension baskets (9, 10). In this embodiment, baskets (9, 10) are rigidly affixed at the top of shell (2) to upper cap (3) and to the bottom support plate (7). Bottom support plate (7), baskets (9, 10) and upper support columns (12b) are temporarily allowed to move in the axial direction by disconnecting flange pairs (60) and removing spacers (65).

The implementation of pre-stressing of the baskets is now described in greater detail wherein the function of the split support column will be made apparent. FIG. 6a-6d illustrate the steps in applying the pre-stress method to the baskets (9, 10). FIG. 6a represents the condition of the basket and support columns at the end of vessel fabrication and prior to loading of the active material. The support members (12b and 12c) and integral flanges (60) are designed such that when fabricated and installed the two opposing flange faces of each support member (12b and 12c) are paired and spaced apart by the predetermined amount of axial stretch (d) of the basket assembly and individual basket walls required to pre-tension the baskets to the desired tensile stress level.

The mating flanges (60) and support members (12b and 12c) are concentric to the internal guide means (50). The internal guide is rigidly attached to one of the support members and slidably engages with the other support member of the pair. When the vessel (1) is fabricated, an initial space (d) is provided between flanges (60) and the space between the mating flanges (60) in the unloaded condition is designed to be equal to or less than the expected or calculated amount of axial displacement of the basket walls imposed by the static load, i.e. from the combined weight of the basket assembly and the active material. Guide means (50) permits the support member (12b) to move only parallel to the vertical axis. Spacers (65) of thickness (d) equal to the flange spacing are inserted between each flange pair as illustrated in FIG. 6a. Preferably, the spacers are segmented (divided into several equal parts) for easy removal. The support members are then rigidly connected (such as bolted together) as shown schematically in FIG. 6a and in greater mechanical detail in FIG. 7. This is the condition of the basket and support column assemblies at the end of vessel fabrication. When the vessel is positioned vertically the weight ($W_{BA}$) of the basket assembly is now supported primarily by the support columns 12(a) rigidly fixed between the bottom support plate (7) and the lower cap (4). The connection of the baskets (9, 10) to the top cap (3) may also provide some support for a small part of the weight of the basket assembly. At this condition, the bed (8) remains empty or unloaded with active material. The position of the bottom support plate (7) relative to the vessel shell (2) and lower cap (4) is shown by the reference line (45) in FIG. 6a.

Spacers (65) of thickness (d) establish the extent of pre-tensioning allowed and when tightly secured between opposing flanges (60) keep the basket assembly rigidly supported at the top and bottom ends of the reactor vessel during the final stages of vessel assembly and transport. The spacers can be made of any material such as carbon steel and any number of spacers can be used as deemed necessary. In this embodiment, four spacers are employed between each flange pair. A hole is drilled through each spacer to allow bolts to pass through the spacers and mating flanges.

After the vessel (1) is in position for use, the spacers (65) are removed prior to loading the active material into the bed (8). Step 2 of the pre-tensioning process is illustrated in FIG. 6b by the application of a jacking force ($F_J$) wherein the basket assembly is lifted just slightly enough to relieve pressure on the spacers (65) so that they can be removed using a hydraulic jack or by other means included but not limited to jack screws attached to the flanges (60). The bottom support plate (7) moves only a small amount (typically no more than 1 mm-5 mm) upward and essentially remains aligned with the original reference position. The jack may be positioned on the ground or foundation of the vessel for lifting and then locked in position once the spacers are removed. At this point, no pre-stress has been applied and all of the weight of the basket assembly is supported by the hydraulic jack. In this state, the support columns provide no support to the basket assembly as the flanges of each support column are physically separated.

In step 3, the bed (8) is filled with active material and the weight ($W_{AM}$) of this material accumulates against the jacking mechanism. The hydraulic jack supports the additional weight of active material and holds the position of the bottom support plate (7) to the original reference position. Step 4 involves slowly lowering the hydraulic jack so that the basket assembly and walls are stretched due to the applied downward force resulting from the weight of the active material. This process continues as the faces of the upper flanges (60) attached to support columns (12b) move downward until they contact the opposing faces of the lower flanges (60) of support columns (12c). Throughout this step, the guide members (50) maintain the alignment of the upper and lower support members (12b and 12c). The bottom support plate (7) moves the same distance as predetermined and allowed by the spacer thickness (d). The stretching distance (d) determines the amount of pre-tension applied, typically less than the maximum available as is inherent in the combined total weight of the active material and basket assembly, i.e. the faces of flange pairs will come into contact prior to the completion of loading all of the active material.

Thus, a predetermined amount of axial pre-stress can be applied up to an amount corresponding to the weight of active material loaded. Once the faces of flanges (60) of each support member are closed and in contact, the weight of the bed (8) and basket assembly is supported by the lower cap (4) with the walls of the basket now in tension. At the final loaded position and with the flanges (60) in firm contact with each other, the baskets (9, 10) are constrained at both the top and bottom. The flanges (60) can be affixed by welding or by the use of fastener means such as bolts, although the combination of the weight of basket assembly and active material and the presence of guide member (50) will provide adequate constraint against lateral movement of the basket assembly.

Alternatively, step 3 may be carried out with the hydraulic jack removed so that the flanges will close slowly according to the rate of loading or accumulation of the active material in bed (8). The net pre-tensioning of the baskets (9, 10) will be identical in both scenarios.

As shown and described, the split support columns (12a) extend between the bottom support plate (7), attached to baskets (9, 10), and the bottom cap (4) of vessel (1). These support columns may be constructed from various types of structural members, e.g. cylindrical columns or pipes, I-beams, channels, box beams, etc. The structural members do not have to be circular in cross section and other configurations such as box or rectangular, etc., may be used. Similarly, the guide means is not limited to a concentric pipe configuration. For example other potentially effective guide means may include various shaped members fitted as external sleeves or internal inserts to similarly shaped columns or the use of pins through one or more of the holes between mating flanges, etc. Although the simple cylindrical configuration fitted with flanges and a cylindrical guide member as shown is a preferred design, other designs can be envisioned to accomplish the same function and are deemed to be operable equivalents, provided that; (a) the support columns are rigidly fixed between the bottom support plate and the bottom cap of the vessel, (b) guide means are employed in multiple support columns to prevent lateral movement of either member of the split support column while maintaining concentricity of the basket assembly within the vessel, and (c) adjustable means, such as removable spacers, are employed to decrease the effective column length while allowing the weight of solid active material to axially stretch the baskets to apply tension to the basket walls. At the end of pre-tensioning, the basket assembly is rigidly supported between the upper (3) and lower (4) caps of the vessel.

The split column support design as shown and described is preferred because it provides a simple means to provide horizontal, flat mating flanges and integral guide means positioned at a convenient work level between the bottom support plate and lower cap of the vessel. However, the basic features of the invention can be accomplished with continuous (non-split) column supports. Such non-split support columns would be permanently attached at one end to either to the bottom support plate (7) or to the lower cap (4), preferably to at least the bottom support plate. The necessary space or gap allowance for pre-tensioning would be created between the opposite (unattached) column end and its facing component, i.e. either the lower cap (4) or the bottom support plate (7). The guide means would then be attached between the unattached column end and directly to the face of the opposing bottom plate (7) or the lower cap (4), i.e. opposite the unattached face of the column support and with the predetermined space (d) for pre-tensioning allowed there between and with the guide means engaged with the column. Alternatively, a support pad with a horizontal face means could be attached rigidly to either the bottom support plate (7) or the lower cap (4) directly opposite the unattached faces of the support columns and the guide means could then be integrally positioned between the column end and support pad. In this latter configuration, the support pad or pedestal could be envisioned as another form of the upper or lower section of the column in the split column design. The implementation of the pre-tensioning would be carried out in the same manner as illustrated in FIGS. 6a-6d and as described above.

Alternative and equivalent means of pre-tensioning and securing the baskets under a tensile load is also provided. In one example, the internal baskets, once assembled within the reactor vessel, may be pre-tensioned mechanically using threaded rods in combination with either an internal or external locking mechanism. Examples of internal locking mechanisms include drilled and tapped holes in the vessel head or in support brackets welded to the vessel and also to the bottom of the baskets or bottom support plate; locking nuts used to capture the threaded rod in supports attached to the basket and to the vessel wall; and a turnbuckle located between two threaded rods permanently attached to the basket and the vessel wall. The pre-tensioning is adjusted from inside the vessel. Examples of external locking mechanisms include drilled and tapped holes through the vessel cap and attached to the bottom of the baskets or bottom support plate and locking nuts used to capture the threaded rod in supports attached to the basket and through the vessel wall. These methods allow the pre-tensioning to be performed external to the vessel. Both internal and external pre-tensioning may be assisted by the weight of the adsorbent loaded in the baskets.

Alternatively, a hydraulic jack may be positioned against a fixed support outside the top end of the reactor vessel with the opposite end of the jack attached to a beam inserted through the reactor along its axis and in contact with the plate forming the bottom of the concentric baskets. The jack is then used to push the bottom support plate into position against the bottom support column or to push mating flanges of a split column together. The bottom support plate or the flanges in the split column support are then secured by welding or bolting while the hydraulic load is maintained. The hydraulic jack and beam are then removed and the basket walls remain under tension and firmly connected to the bottom cap of the reactor vessel.

In all of the above pre-stressing methods, the amount of pre-tension should be predetermined to prevent axial buckling of the baskets by fully or partially offsetting the thermally induced compressive stress.

The radial flow reactor of this invention can be employed in gas purification, separation or reaction processes using beds of active materials as are well known in the art. Preferred processes are those requiring a repeating cyclic operation. Most preferably, the present reactor is used in cyclic adsorption processes such as PSA, VPSA, and TSA processes and most preferably in prepurification processes on the front end of ASUs.

The solid active material may be an adsorbent, catalyst or reactant material consisting of free flowing solid particles in the form of spheres, cylinders, irregular granules, etc. The active material is selected for the particular process employed and a wide range of materials are known.

For air purification or separation processes, adsorbent material is used and is typically a zeolite-type molecular sieve material as is known and commercially available. The adsorbent material used within the modular adsorbent bed unit can be composed of a single layer material or, a two or more layer material configuration where the first layer (such as activated alumina) nearest the feed inlet removes water from the feed gas and the second layer (such as zeolite molecular sieve) adsorbs a selected gas component such as carbon dioxide in purification or nitrogen in air separation. The adsorbent material is preferably densely packed to minimize adsorbent settling and other particle motion and to maximize process efficiencies.

It should be apparent to those skilled in the art that the subject invention is not limited by the examples provided herein which have been provided to merely demonstrate the operability of the present invention. The scope of this invention includes equivalent embodiments, modifications, and variations that fall within the scope of the attached claims.

What is claimed is:
1. A radial bed reactor comprising:
 a) a substantially cylindrical vessel shell having a vertical longitudinal axis, an upper cap and a lower cap;
 b) a substantially cylindrical porous outer basket disposed concentrically inside the shell along the longitudinal axis and attached to the upper cap of the shell;
 c) a substantially cylindrical porous inner basket concentrically inside the porous outer basket along the longitudinal axis and attached to the upper cap of the vessel,
 d) a bottom support plate disposed inside the shell and connected to the bottom of inner and outer baskets so as to form a solid bottom surface of the baskets; and
 f) at least three support columns disposed between the bottom support plate and the lower cap of the vessel with means for moving the bottom support plate and the baskets along the longitudinal axis to provide a predetermined longitudinal tension to the baskets.

2. The radial bed reactor of claim 1 wherein the support columns comprise two mating support members capable of being separated along the longitudinal axis to provide a space there between.

3. The radial bed reactor of claim 2 wherein at least one of the support columns has a guide means to provide alignment for the support members.

4. The radial bed reactor of claim 3 wherein the guide means is positioned within the support members.

5. The radial bed reactor of claim 4 wherein the support columns and the guide means are cylindrical.

6. The radial bed reactor of claim 1 wherein the adjustable means are positioned on the support columns enabling the baskets to be lowered along the longitudinal axis.

7. The radial bed reactor of claim 1 wherein continuous support columns are attached to the bottom support plate, the lower cap, or both and the longitudinal movement is created by a means for moving the bottom support plate, the lower cap, or both a predetermined space along a guide means engaged within and affixed to the support columns.

8. The radial bed reactor of claim 2 wherein the adjustable means are positioned between the support members enabling at least the outer basket to be lowered along the longitudinal axis.

9. The radial bed reactor of claim 8 wherein the adjustable means are removable spacers.

10. The radial bed reactor of claim 1 wherein the walls of the baskets are axially flexible and radially rigid.

11. The radial bed reactor of claim 10 wherein the baskets have walls that are made from perforated metal sheets.

12. The radial bed reactor of claim 11 wherein the perforated metal sheets include elongated slots that are staggered and oriented horizontal relative to the vertical vessel axis.

13. The radial bed reactor of claim 1 wherein screens are positioned between at least the bed and the inner basket, the screens having a mesh opening smaller than the average particle diameter of the active material.

14. The radial bed reactor of claim 1 with at least one layer of active material distributed around the longitudinal axis in the annular space formed between the concentric baskets.

15. The radial bed reactor of claim 1 wherein stiffening ribs are placed on the inside wall of inner basket in a horizontal plane and extending around the circumference of inner basket.

16. A cyclic gas reaction process conducted in a radial bed reactor comprising:
   a) a substantially cylindrical vessel shell having a vertical longitudinal axis, an upper cap and a lower cap;
   b) a substantially cylindrical porous outer basket disposed concentrically inside the shell along the longitudinal axis and attached to the upper cap of the shell;
   c) a substantially cylindrical porous inner basket concentrically inside the porous outer basket along the longitudinal axis and attached to the upper cap of the vessel;
   d) a bottom support plate disposed inside the shell and connected to the bottom of inner and outer baskets so as to form a solid bottom surface of the baskets;
   e) at least one layer of active material distributed around the longitudinal axis in the annular space formed between the concentric baskets; and
   f) at least three support columns disposed between the bottom support plate and the lower cap of the vessel with means for moving the bottom support plate and the baskets along the longitudinal axis to provide longitudinal tension to the baskets, and wherein a feed gas enters the reactor and is directed into an outer channel formed between the shell and the outside wall of the outer basket, flows through the wall of the outer basket in a radial direction through the bed, exits through the wall of the inner basket into a central channel aligned with the longitudinal axis of the reactor, and exits the reactor.

17. The gas separation process of claim 16 used in a process selected from the group consisting of a PSA, VPSA and TSA process.

18. The gas separation process of claim 17 wherein the process is a prepurification process to treat incoming feed air prior to a cryogenic distillation process.

19. A method for pre-stressing at least the outer basket in a radial flow reactor of the type having:
   a) a substantially cylindrical vessel shell having a vertical longitudinal axis, an upper cap, and a lower cap;
   b) a substantially cylindrical porous outer basket disposed concentrically inside the shell along the longitudinal axis and attached to the upper cap of the shell;
   c) a substantially cylindrical porous inner basket concentrically inside the porous outer basket along the longitudinal axis and attached to the upper cap of the vessel;
   d) a bottom support plate disposed inside the shell and connected to the bottom of inner and outer baskets so as to form a solid bottom surface of the baskets;
   e) annular space formed between the concentric baskets to accept at least one layer of active material distributed around the longitudinal axis in the annular space; and
   f) at least three support columns disposed between the bottom support plate and the lower cap of the shell of the vessel with means for moving the bottom support plate and the baskets along the longitudinal axis,
the method comprising activating the means for moving the baskets downward in a predetermined longitudinal direction to provide longitudinal tension to the baskets.

20. The method of claim 19 wherein the activating occurs by loading the active material into the annular space.

21. The method of claim 20 wherein the baskets are lowered a predetermined distance to provide a predetermined tension to the baskets.

22. The method of claim 19 wherein the means for moving the baskets is through the use of movable support columns comprising two support members and a removable spacer there between whereby the support column moves downward when the spacer is removed.

23. The method of claim 19 wherein the activating occurs through the use of mechanically means capable of providing tension to the baskets.

24. The method of claim 23 wherein the mechanical means is one or more threaded rods in combination with a locking mechanism for lowering the baskets thereby providing predetermined tension to the baskets.

25. The method of claim 19 wherein the means for moving the baskets downward occurs when the weight of the active material moves the baskets downward thereby providing tension to the basket walls.

26. A substantially vertically oriented split support column structure used in a radial bed reactor vessel to support one or more concentric baskets within the vessel and used to confine active material in the annular space between the baskets comprising:
   a) a first support member having a top and a bottom with the top connected to the vessel and the bottom having a first flange;
   b) a second member having a top and a bottom with the top having a second flange and designed to removably engage the first flange; and
   c) a guide member affixed to one of the first or the second support members which can movably engage the first support member to the second support member along the vertical axis,
wherein one or more removable spacers are positioned between the first flange and the second flange which can be removed to contact the first and second flanges thereby moving the baskets downward.

* * * * *